(12) United States Patent
Leonhardt

(10) Patent No.: US 8,203,024 B2
(45) Date of Patent: Jun. 19, 2012

(54) TORREFACTION SYSTEMS AND METHODS INCLUDING CATALYTIC OXIDATION AND/OR REUSE OF COMBUSTION GASES DIRECTLY IN A TORREFACTION REACTOR, COOLER, AND/OR DRYER/PREHEATER

(75) Inventor: Mark Alan Leonhardt, Columbia, SC (US)

(73) Assignee: Advanced Toffefaction Systems, LLC, Kirkwood, MO (US)

( * ) Notice: Subject to any disclaimer, the term of this patent is extended or adjusted under 35 U.S.C. 154(b) by 0 days.

(21) Appl. No.: 13/238,890

(22) Filed: Sep. 21, 2011

(65) Prior Publication Data

US 2012/0017499 A1    Jan. 26, 2012

Related U.S. Application Data

(60) Provisional application No. 61/526,425, filed on Aug. 23, 2011.

(51) Int. Cl.
  *C07C 1/00*    (2006.01)
  *F27B 15/14*   (2006.01)
  *C10B 21/00*   (2006.01)

(52) U.S. Cl. ........ 585/240; 422/140; 422/146; 422/610; 201/2.5; 201/16; 201/27; 202/208

(58) Field of Classification Search ............... 585/240, 585/242; 44/605; 201/2.5, 16, 27; 422/610, 422/628, 643, 140, 146; 202/208
See application file for complete search history.

(56) References Cited

U.S. PATENT DOCUMENTS

| | | | |
|---|---|---|---|
| 4,553,978 A | 11/1985 | Yvan | |
| 4,732,091 A | 3/1988 | Gould | |
| 4,787,917 A | 11/1988 | Leclerc de Bussy | |
| 4,917,023 A | 4/1990 | Jones | |
| 5,186,740 A | 2/1993 | Sancinelli | |
| 5,728,361 A | 3/1998 | Holley | |
| 5,853,548 A | 12/1998 | Piskorz et al. | |
| 6,035,791 A | 3/2000 | Hery | |
| 6,941,879 B2 | 9/2005 | Hahn et al. | |
| 7,942,942 B2 * | 5/2011 | Paoluccio | 44/605 |
| 2007/0266623 A1 | 11/2007 | Paoluccio | |
| 2008/0210536 A1 | 9/2008 | Hery | |
| 2009/0084029 A1 * | 4/2009 | Bergman | 44/605 |
| 2009/0183661 A1 * | 7/2009 | Furukawa et al. | 110/215 |
| 2010/0101141 A1 | 4/2010 | Shulenberger et al. | |
| 2010/0242351 A1 * | 9/2010 | Causer | 44/505 |
| 2010/0251615 A1 | 10/2010 | Marker et al. | |
| 2010/0273899 A1 * | 10/2010 | Winter | 518/703 |
| 2011/0041392 A1 | 2/2011 | Stromberg et al. | |

FOREIGN PATENT DOCUMENTS

| | | |
|---|---|---|
| EP | 513051 | 12/1994 |
| GB | 2448531 | 10/2008 |
| WO | WO2005/056723 | 6/2005 |
| WO | WO2010/115563 | 10/2010 |

\* cited by examiner

*Primary Examiner* — Nina Bhat
(74) *Attorney, Agent, or Firm* — Harness, Dickey & Pierce, P.L.C.

(57) ABSTRACT

A method for torrefying biomass comprises using an oxidation catalyst to combust gas produced by torrefaction, and thereby produce combustion flue gas. The method also comprises introducing the combustion flue gas into a torrefaction reactor and/or a cooler.

20 Claims, 1 Drawing Sheet

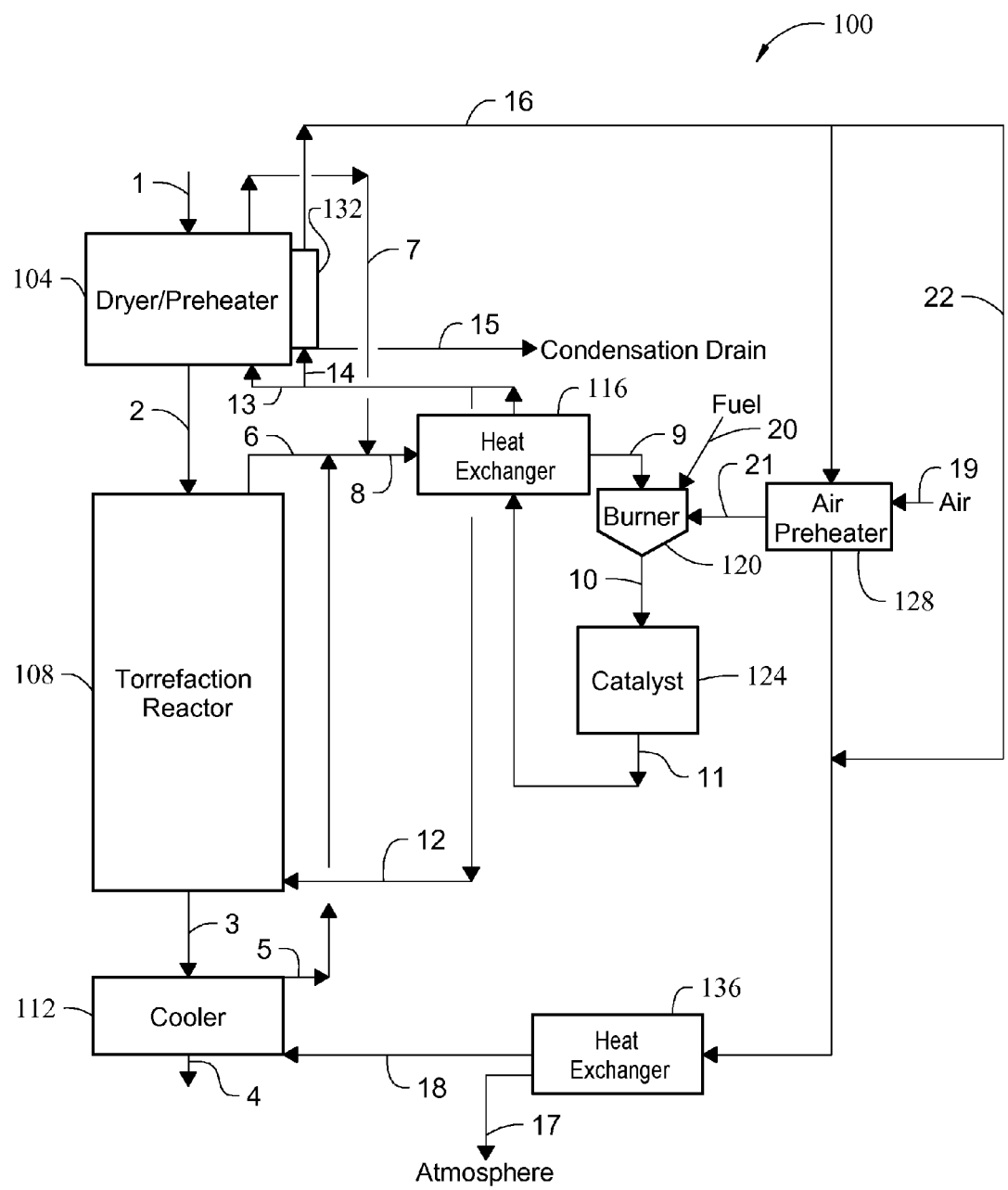

TORREFACTION SYSTEMS AND METHODS INCLUDING CATALYTIC OXIDATION AND/OR REUSE OF COMBUSTION GASES DIRECTLY IN A TORREFACTION REACTOR, COOLER, AND/OR DRYER/PREHEATER

CROSS-REFERENCE TO RELATED APPLICATION

The instant application claims priority to U.S. Provisional Application Ser. No. 61/526,425 filed Aug. 23, 2011.

FIELD

The present disclosure generally relates to torrefaction systems and methods including catalytic oxidation and/or reuse of combustion gases directly in a torrefaction reactor, a cooler, and/or a dryer/preheater.

BACKGROUND

This section provides background information related to the present disclosure which is not necessarily prior art.

Renewable energy sources are getting more attention due to the environmental impact and/or limited supply of fossil fuels. Unlike fossil fuels, renewable energy is derived from natural resources that may be replenished, such as sunlight, wind, geothermal, and biomass.

Biomass is a renewable energy source, which is biological material from a living or recently living organism such as wood or plant matter. There are a wide variety of processes for converting biomass into a renewable energy source, including combustion, gasification, pyrolysis, etc.

SUMMARY

This section provides a general summary of the disclosure, and is not a comprehensive disclosure of its full scope or all of its features.

Disclosed herein are example embodiments of torrefaction systems and methods for producing torrefied products from biomass. Exemplary embodiments include catalytic oxidation and/or reuse of the resultant combustion gases directly in a torrefaction reactor, a cooler, and/or a dryer/preheater.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic process flow diagram representative of an exemplary torrefaction system and process for producing torrefied products from cellulosic biomass.

DETAILED DESCRIPTION

The following description is merely exemplary in nature and is in no way intended to limit the present disclosure, application, or uses.

Torrefaction of biomass may be generally described as a mild form of pyrolysis at temperatures typically ranging between 200 to 300 degrees Celsius. During a typical torrefaction process, the properties of the biomass may be changed to obtain a much better fuel quality for later combustion of the torrefied biomass for production of energy. With conventional torrefaction systems using conventional combustion, the inventor hereof has recognized two drawbacks or problems. First, the resultant flue gases are too high in residual oxygen content to be used directly in either the reactor or the cooler of a torrefaction system. Second, a suitable internally-produced inert gas stream is not available to be used in the cooler. This would also preclude integration of the reactor and cooler.

Accordingly, the inventor has disclosed herein exemplary embodiments of torrefaction systems and methods, which include catalytic oxidation to combust gases and/or reuse of the resultant combustion gases directly in a torrefaction reactor, a cooler, and/or a dryer/preheater. The inventor's disclosed torrefaction systems and methods may be used for producing torrefied products (e.g., wood pellets, agricultural pellets, etc.) from cellulosic biomass, such as wood, agricultural residue, among other cellulosic biomasses, etc. Pellets are just examples as the torrefied end product from the inventor's torrefaction systems and methods does not necessarily have to be densified into pellets or any other compact densified end product. While pellets may be advantageously sized for long distance shipping, the added expense associated with pelletizing or other densification processes may be avoided, for example, if the torrefaction plant is located close to a power plant such that there is no need for long distance. As another example, torrefied biomass produced by the inventor's systems and methods may be used as a feedstock in a subsequent process for producing cellulosic ethanol. Aspects of the present disclosure should not be limited to producing any one particular torrefied biomass as aspects of the inventor's systems and methods may also be employed while producing other torrefied biomass or products.

Disclosed herein are systems and methods that use a fixed-bed catalyst for the catalytic oxidation of the torrefaction byproduct gases, which sets the inventor's technology apart from all other known torrefaction technologies. With the inventor's technology, the resultant low-oxygen flue gases and heat produced from the catalyst may be used directly in the process. The use of the oxidation catalyst thus provides a low residual-oxygen flue gas stream that can be used directly in the reactor and/or cooler improving heat integration and allowing lower capital and operating costs. This is especially advantageous in the cooler where an inert cooling gas is needed to safely cool torrefaction products because with the inventor's technology, the low residual-oxygen flue gas stream from the catalytic oxidation combustion can be directly used in the cooler, thereby eliminating the need to separately purchase inert gas for the cooler. Direct inert gas cooling is more cost effective than other methods that include supplying an externally-provided inert gas stream, such as nitrogen.

Further capital and operating cost reduction may be achieved by integration of the cooler and reactor. That is, use of inert gas stream provided by oxidation catalyst allows integration of reactor and cooler resulting in lower capital and operating costs. Using the oxidation catalyst generates a low-oxygen inert gas stream suitable for safely cooling hot torrefaction products whether the cooler is integrated with the reactor or not, providing more cost-effective cooling. In some disclosed embodiments, the inventor's integrating of the reactor and cooler for heat recovery allows for improved heat integration and reduced capital and operating costs. The heated cooling gases exiting the cooler are recovered either directly in the reactor (if integrated with cooler) or by recycle to the oxidation catalyst. The recovery of heat from the cooler improves heat integration and reduces energy costs. This is facilitated by direct use of an inert gas stream (low oxygen level) that results from catalytic oxidation of the torrefaction byproducts.

The inventor's use of a fixed-bed oxidation catalyst promotes combustion at significantly lower temperatures than conventional combustion while also allowing the combustion to occur at significantly lower residual oxygen levels. The low-temperature catalytic oxidation of torrefaction byproducts with the fixed-bed catalyst results in and/or promotes lower air emissions, primarily nitrogen oxides ($NO_x$) with essentially no $NO_x$ formation (e.g., nitric oxide and nitrogen dioxide).

Some exemplary embodiments of the inventor's torrefaction systems and methods include using the combustion gas (inert flue gas resulting from the fixed-bed oxidation catalyst) directly in the cooler in which the combustion gases actually contact the torrefied biomass. By using the inert flue gas directly in the cooler, the need to separately purchase inert gas for the cooler is eliminated. In addition, indirect gases from the dryer/preheater after being cooled are also used in the cooler in some exemplary embodiments. The indirect gases from the dryer/preheater tend to be lower temperature and have significantly lower moisture content. The indirect heating of the dryer/preheater can be via a jacket, heating coils, etc.

By way of background, torrefied biomass typically needs to be cooled below about 150 degrees Celsius before the torrefied biomass can be safely exposed to air. Though air is generally considered the most cost-effective cooling medium, air cannot be used initially for safety reasons. That means that other conventional technologies will either require expensive nitrogen systems for inerting or cooling with some other medium like water, which would also be expensive unless the plant were located on a river and allowed to withdraw the necessary cooling water. The other option would be a cooling tower, which is also expensive from a capital and operating cost standpoint. In contrast, the inventor's technology allows the low residual-oxygen flue gas stream from the catalytic oxidation combustion to be directly used in the cooler, thereby eliminating the need to separately purchase inert gas for the cooler or use of some other medium like water.

In accordance with some exemplary embodiments, a torrefaction system may include a vertical, cylindrical, fluidized-bed reactor design, which allows biomass to flow downward by gravity without pneumatic or mechanical conveying. Hot torrefaction gas flows upward (countercurrent) through the downwardly flowing biomass in the fluidized-bed reactor. The hot torrefaction, fluidizing gas may be a combination of superheated steam from the process moisture, superheated steam and carbon dioxide, which are byproducts of the combustion process, and residual nitrogen from combustion air. A low residual oxygen level in the flue gas is obtained by combusting torrefaction byproducts in a fixed-bed catalyst at low oxygen levels by careful control of the combustion airflow. Countercurrent gas flow may also be used in a preheater/dryer and/or cooler. The preheater/dryer may be separate from the torrefaction reactor, which may thus allow for improved control and compensate for varying biomass types and moisture levels. The flue gas exiting the dryer may also be cooled and used as an inert cooling medium to safely cool the torrefaction products to below their auto ignition temperature. The system includes a fixed-bed catalyst system to achieve a low-temperature oxidation of the torrefaction gases evolved from the reactor with resultant low residual oxygen levels. The low-temperature oxidation also allows essentially complete combustion to occur within the catalyst system without any significant $NO_x$ (nitrogen oxides) emissions being produced. The resultant low-temperature, low-oxygen combustion gases may be used directly in the torrefaction reactor and/or cooler and/or directly and indirectly in the dryer systems, which maximizes or at least increases heat integration. For example, recovery of heat from the cooler improves heat integration and reduces energy costs. The indirect stream from the dryer can then be further cooled, condensing moisture and leaving an inert gas stream (primarily nitrogen and carbon dioxide) to be used as an inert cooling gas medium to safely cool the torrefaction products to below their auto ignition temperature. The degree of torrefaction can be varied relatively easily by changing torrefaction temperature, residence time, or both. If desired, the design is flexible enough to allow the preheater/dryer and torrefaction reactor to be operated under milder conditions acting as a dryer for production of wood pellets or agricultural pellets.

With reference now to FIG. 1, there is shown a schematic process flow diagram representative of an exemplary embodiment of a torrefaction system 100 embodying one or more aspects of the present disclosure. In operation, the system 100 may be used for producing torrefied products from cellulosic biomass.

As shown in FIG. 1, the system 100 includes various components which will be described in more detail below, along with their function and operation during an exemplary process for producing torrefied products from biomass. Generally, the system 100 includes a dryer/preheater 104, a torrefaction reactor 108, a cooler 112, one or more heat exchangers 116, 136 (e.g., an air-to-air heat exchanger, etc.), a burner/preheater 120, a catalyst system 124, and a combustion air preheater 128.

FIG. 1 also illustrates the exemplary manner (as represented by arrows 1 through 21) in which these various components are coupled to or in communication with other components of the system 100. For example, and as described in more detail below, the torrefaction reactor 108 is coupled to or in communication with the dryer/preheater 104 (as represented by arrow 2), such that the torrefaction reactor 108 may receive dried biomass from the dryer/preheater 104. As another example, the torrefaction reactor 108 is also coupled to or in communication with the cooler 112 (as represented by arrow 3), such that the cooler 112 may receive torrefied biomass from the torrefaction reactor 108. As a further example, the torrefaction reactor 108 is also coupled to or in communication with the heat exchanger 116, such that gas may be discharged from the torrefaction reactor 108 to the heat exchanger 116 (as represented by arrow 6) and such that gas may be introduced into the torrefaction reactor 108 from the heat exchanger 116 (as represented by arrow 12).

Any suitable configuration of conduits, lines, pipes, valves, air locks, etc. may be used between various components of the inventor's disclosed systems for coupling and/or placing them in communication with other components. In addition, FIG. 1 illustrates various components directly coupled to or in direct communication with other components without any intervening components therebetween. But this arrangement illustrated in FIG. 1 is illustrative only and is not required for all embodiments. For example, FIG. 1 illustrates the condensation jacket 132 directly coupled to and in direct fluid communication with the combustion air preheater 128. But other embodiments may include one or more intervening components which are not illustrated in FIG. 1, such as a heat exchanger between the condensation jacket 132 and the combustion air preheater 128.

As noted above, the system 100 includes the catalyst system 124, which will now be described in more detail. During operation of the system 100, oxygen is consumed and therefore removed through combustion in the fixed-bed catalyst system 124. That is, the oxygen reacts with fuels in combustion forming carbon dioxide and water (complete combustion). So as combustion progresses, the oxygen is consumed and therefore removed through combustion. In this exemplary system 100, there is a preheater/supplementary heater or burner 120 upstream of the catalyst bed 124 such that the residual oxygen level from this burner 120 will be consumed in the catalyst bed 124. Accordingly, the fixed-bed catalyst system 124 is thus configured so as to achieve a low-temperature, low residual oxygen catalytic oxidation of the torrefaction gases produced. The low-temperature oxidation allows essentially complete combustion to occur within the catalyst system 124 without any significant $NO_x$ emissions being produced. Carbon monoxide and products of incomplete combustion (PIC's) are also significantly reduced or minimized. During the low-temperature, low residual oxygen catalytic oxidation, the total oxygen is proportional to the amount of fuel that is being combusted. The amount of oxygen at the inlet to and for a portion through the catalyst system 124 may be relatively high, but the amount of oxygen will be low at the outlet (residual) in this exemplary embodiment.

The resultant low-temperature, low-oxygen combustion gases allow use directly in the torrefaction reactor 108, cooler 112, and dryer/preheater 104. This direct reuse of the combustion gases, in turn, allows heat integration to be maximized or at least increased.

Residual oxygen content in the flue gas of conventional, typical combustion processes is about 2.5% oxygen. In comparison, catalytic oxidization can be conducted at residual oxygen levels as low as 100 parts per million (ppm). Since torrefaction requires a low oxygen environment, flue gas from a conventional combustion process (burner) cannot be used directly in the reactor for heating without adverse consequences. As a result of indirect heating, combustion gases ultimately vent from conventional systems at a higher temperature resulting in greater heat loss and lower overall energy efficiency. In comparison, the inventor's disclosed systems and methods include direct use of the combustion gas, which also provides inert gases carbon dioxide and nitrogen that can be directly used in the cooler and torrefaction reactor and also improves safety of the operation. Conventional systems typically use superheated steam as the inerting medium, which superheated steam is not an option for inerting in the cooler since the process of cooling will cause the steam to change from vapor to liquid. With the inventor's disclosed systems and methods, the carbon dioxide and nitrogen can be used in the cooler as the carbon dioxide and nitrogen will remain an inert gas at the lower temperatures associated with the cooling process.

By using a catalyst to combust a fuel and produce heat in the inventor's systems and methods, all (or substantially all) of the fuel may be combusted and converted to heat. This heat may then be directly reused in the torrefaction process. For example, output heat may be used directly back into the process to heat the biomass in the torrefaction reactor 108 and in the dryer/preheater 104 as explained below.

Catalytic oxidation occurs in the catalyst system 124 by using one or more combustion catalysts, such as platinum/palladium catalyst, etc. In an exemplary embodiment, the combustion catalyst is primarily a platinum/palladium catalyst, and no inhibitors or precatalysts were used. But in alternative embodiments, one or more other suitable catalysts, one or more precatalysts, and/or one or more inhibitors may be used.

By way of example only, the catalyst system 124 may comprise or be similar to a fixed-bed catalyst system used in environmental control systems for VOC and CO destruction, such as a catalytic converter used in automobile exhaust systems. This example, however, is provided for the purpose of illustration only as exemplary embodiments may include other catalyst systems than those disclosed herein.

With continued reference to FIG. 1, the dryer/preheater 104 includes an inlet (as represented by arrow 1) for the introduction of biomass into the dryer/preheater 104. In an exemplary embodiment, biomass is gravity fed (fed solely or at least partially under the influence of gravity) to the dryer/preheater 104 through a variable speed rotary air lock. The particular configuration (e.g., horsepower, etc.) of the rotary air lock may be selected depending on the process requirements such as production rate, etc. The variable speed rotary air lock allows for control of the biomass feed rate and provides an air lock between the dryer/preheater 104 and the source (e.g., feed bin, etc.) supplying the biomass (e.g., wet biomass and/or dry biomass, etc.). In the dryer/preheater 104, the biomass flows downward by gravity without requiring pneumatic or mechanical conveying of the biomass. In this exemplary embodiment, the process is a vertical process allowing gravity feed through the preheater/dryer, reactor, and cooler, though there will also be mechanical or pneumatic conveying into the feed bin. Alternative embodiments may include other means for introducing and conveying biomass besides variable speed rotary air locks and gravity, such as mechanically or pneumatically operated conveyor system, etc.

The dryer/preheater 104 also receives hot gases (as represented by arrow 13) from the heat exchanger 116 and catalyst 124. The hot gases are blown upward in the dryer/preheater 104 by a blower and motor, such that the hot gases flow upward in the dryer/heater 104. The particular configuration (e.g., horsepower, etc.) of the blower and motor may be selected depending on the process requirements such as production rate, etc. In this exemplary embodiment, the hot gases thus flow countercurrent to the downward flow of biomass in the dryer/preheater 104 and support extraction of moisture or drying of the biomass. The countercurrent flow of hot gas in the dryer/preheater 104 is a combination of superheated steam from the process moisture and combustion reaction, carbon dioxide, which is also a product of the combustion reaction, and residual nitrogen from the combustion air.

Advantageously, the inventor's use of a separate dryer/preheater 104 (e.g., not integrated into or contained within the torrefaction reactor 108, etc.) allows for improved control. In addition, the use of a separate dryer/preheater 104 may be used to compensate for varying biomass types and moisture levels. Alternative embodiments may not include a separate dryer/preheater, but instead may include a single integrated unit having both a drying chamber and torrefaction chamber housed therein.

With further reference to FIG. 1, gases exit the dryer/preheater 104 (as represented by arrow 7) and are combined with off gas from the cooler 112 (as represented by arrow 5) and gas from the torrefaction reactor 108 (as represented by arrow 6). The gases may pass through one or more dust collector systems (not shown) before or after they are combined, which combination is represented by the intersection of arrows 5 and 7 with arrow 6). The combined gases are then introduced into the heat exchanger 116 (as represented by arrow 8) for catalyst preheating. While the catalytic oxidation in the catalyst bed 124 occurs at much lower temperatures than traditional combustion processes, there is a minimum activation energy needed to activate or initiate the catalytic oxidation reaction which is achieved by the catalyst preheating.

Gases exit the heat exchanger 116 (as represented by arrow 9) and are introduced to the burner/preheater 120 for additional heating, if needed. By way of example only, the burner/preheater 120 may comprise a biomass or fossil fuel burner. Alternative embodiments may include differently configured (e.g., larger or smaller, etc.) burners.

From the burner/preheater 120, hot gases exit (as represented by arrow 10) and are passed through the catalyst bed 124 where pyrolysis byproducts are combusted and destructed as explained herein. From the catalyst bed 124, the gases exit (as represented by arrow 11) and return to the heat exchanger 116. The combustion gases from the heat exchanger 116 are then circulated to the torrefaction reactor 108, dryer/preheater 104, and jacket 132 (as represented by arrows 12, 13, and 14) whereat the combustion gases are reused. For example, the combustion gases may be directly reused in the torrefaction reactor 108 to support direct heating and/or torrefying of the biomass in the torrefaction reactor 108 whereat the combustion gases make actual or direct contact with the biomass. The combustion gases may also be directly reused in the dryer/preheater 104 to support direct preheating, extraction of moisture, and/or drying of the biomass in the dryer/preheater 104 whereat the combustion gases make actual or direct contact with the biomass. Combustion gases may also be used in the jacket 132 to support indirect heating of biomass in the dryer/preheater 104 via conduction (e.g., heat conduction through metal walls of the jacket section 132 and dryer/preheater 104 to the biomass, etc.) without any actual physical contact between the combustion gases in the jacket section 132 and the biomass in the dryer/preheater 104. The combustion gases may additionally be directly reused in the cooler 112 after passing through the heat exchanger 136 (as shown by arrows 22 and 18) to support direct cooling of the torrefied biomass in the cooler 112 whereat the combustion gases make actual or direct contact with the torrefied biomass.

In the inventor's example embodiment, the combustion gases are being used directly in that they actually contact the biomass in the torrefaction reactor 108, cooler 112, and dryer/heater 104. The combustion gases are able to be directly reused in the torrefaction reactor 108 and cooler 112 as a result of the low-temperature, low residual oxygen catalytic oxidation of the gases achieved by the fixed-bed catalyst system 124. In contrast, other conventional torrefaction processes may only use the combustion gases indirectly in the reactor without any actual contact between the combustion gases and the biomass. Other conventional torrefaction processes may additionally or alternatively only use the combustion gases directly in the preheater/dryer since the lower temperatures in the preheater/dryer are not high enough to cause the oxygen to react with the biomass. But conventional systems do not include direct reuse of combustion gases in a reactor and/or a cooler in which the combustion gases actually contact the biomass.

As just mentioned, hot gases from the heat exchanger 116 are fed directly to the biomass in the torrefaction reactor 108, dryer/heater 104 (as represented by arrows 12 and 13) and into the jacket 132 (as represented by arrow 14). In the jacket section 132 of the dryer/preheater 104, steam evolved from the process is condensed. In this example, the jacket section 132 is where the majority of the moisture from the biomass leaves the process. As represented by arrow 15, the condensate is drained from the jacket 132 through a steam trap (not shown) and discharged to the sewer for municipal wastewater treatment. Also in the jacket section 132, resultant combustion gases may be used to support indirect heating of biomass in the dryer/preheater 104 via conduction (e.g., heat conduction through metal walls of the jacket section 132 and dryer/preheater 104 to the biomass, etc.) without any actual physical contact between the combustion gases in the jacket section 132 and the biomass in the dryer/preheater 104. From the jacket 132, warm gas exits and is introduced to the combustion air preheater 128 (as represented by arrow 16) for preheating of combustion air in the combustion air preheater 128. In the combustion air preheater 128, the warm gas from the jacket 132 preheats the combustion gases, which preheating also cools the gases from the jacket 132. The gases then exit the combustion air preheater 128 and pass through a heat exchanger 136 to be further cooled (e.g., by ambient air, etc.) before introduction to the cooler 112. A lot of moisture is also removed in the heat exchanger 136 in this example. Accordingly, this illustrated exemplary embodiment thus includes three separate heat exchangers (e.g., air-to-air heat exchangers, etc.), specifically, the combustion air preheater 128, the heat exchanger 116, and the heat exchanger 136.

The torrefaction reactor 108 receives at least partially dried and preheated biomass exiting the dryer/preheater 104 (as represented by arrow 2). In this exemplary embodiment, dried and preheated biomass is gravity fed (fed solely or at least partially under the influence of gravity) from the dryer/preheater 104 through a variable speed rotary air lock to the torrefaction reactor 108. This variable speed rotary air lock allows for control of the feed rate into the torrefaction reactor 108 and also provides an air lock between the dryer/preheater 104 and torrefaction reactor 108. In the torrefaction reactor 108, biomass flows downward by gravity without requiring pneumatic or mechanical conveying of the biomass. Alternative embodiments may include other means for introducing and conveying biomass besides variable speed rotary air locks and gravity, such as mechanically or pneumatically operated conveyor system, etc.

The torrefaction reactor 108 may preferably have a vertical, cylindrical, fluidized-bed reactor design. This reactor configuration allows biomass to flow downward by gravity without requiring pneumatic or mechanical conveying of the biomass through the torrefaction reactor 108. Hot combustion gas from the heat exchanger 116 is fed into to the torrefaction reactor 108 (as represented by arrow 12) by using a blower and motor. In this example, the blower is located at or towards the bottom of the torrefaction reactor 108, though the blower may be located elsewhere in other embodiments. This configuration allows generally uniform distribution of hot fluidizing or torrefying gases throughout the reactor diameter, which diameter may, for example, be about 8 feet.

Within the torrefaction reactor 108, hot gas is blown upwardly by the blower and thus flows countercurrent through the biomass, which is moving downward through the torrefaction reactor 108. The countercurrent flow of hot gas in the torrefaction reactor 108 is a combination of superheated steam from the process moisture, superheated steam and carbon dioxide, which are byproducts of the combustion process, and residual nitrogen from combustion air. Gases exit the torrefaction reactor 108 from or towards the top of the reactor 108 (as represented by arrow 6), which gases, as explained above, are combined with gas from cooler 112 and dryer/preheater 104 before they are passed through the heat exchanger 116.

The cooler 112 receives hot, torrefied biomass from the torrefaction reactor (as represented by arrow 3). In this exemplary embodiment, hot, torrefied biomass is gravity fed (fed solely or at least partially under the influence of gravity) from the torrefaction reactor 108 through a variable speed rotary air lock to the cooler 112. The variable speed rotary air lock may preferably be located at or towards the bottom of the torrefaction reactor 108. The rotary air lock provides an air lock between the torrefaction reactor 108 and the cooler 112.

In the cooler 112, combustion gases are directly reused as they make actual contact with the torrefied biomass in the cooler 112. In this example, combustion gases are able to be directly reused in the cooler 112 as a result of the low-temperature, low residual oxygen catalytic oxidation of combustion gases achieved by the fixed-bed catalyst system 124. The combustion gases may additionally be directly reused in the cooler 112 after passing through the heat exchanger 136 (as shown by arrows 22 and 18) to support direct cooling of the torrefied biomass in the cooler 112 whereat the combustion gases make actual or direct contact with the torrefied biomass. As explained herein, the inventor's use of a fixed-bed oxidation catalyst system 124 promotes combustion at significantly lower temperatures than conventional combustion while also allowing the combustion to occur at significantly lower residual oxygen levels.

The inventor's use of inert gas stream provided by the oxidation catalyst allows integration of the reactor and cooler resulting in lower capital and operating costs. Using the oxidation catalyst generates a low-oxygen inert gas stream suitable for safely cooling hot torrefaction products whether the cooler is integrated with the reactor or not, which beneficially provides more cost-effective cooling than other options such as separately purchasing inert gas and/or using water as the cooling medium from an expensive cooling water tower.

The speed of the rotary air lock may be set to determine the overall production rate, which also determines reactor residence time. In addition, a series of thermocouples or other suitable temperature sensors may be hung throughout the torrefaction reactor 108 to allow monitoring of the fluidized bed temperature profile throughout the reactor 108. The degree of torrefaction can thus be varied relatively easily by changing torrefaction temperature, reactor residence time, or both. If desired, the inventor's disclosed torrefaction systems also have a relatively flexible design that allows the preheater/dryer and torrefaction reactor to be operated under milder conditions acting as a dryer for production of wood or agricultural pellets.

As noted above, the cooler 112 receives hot, torrefied biomass from the reactor 108 via the rotary air lock (as represented by arrow 3). Within the cooler 112, cooled gas is received from heat exchanger 136 (as represented by arrow 18), which, in turn, receives gases from the combustion air preheater 128. This cooled gas may be used to provide initial cooling of the torrefied biomass to below a predetermined temperature (e.g., ~150° C., etc.) at which it would be acceptable or safe to allow for further air cooling of the torrefied biomass in a product bin. The cooled gas flows upward and countercurrently to the biomass, which moves downward through the cooler 112 under the influence of gravity. By way of example, a blower and motor may be used for blowing and causing the cooled gas to flow upward in the cooler 112.

In this exemplary embodiment, the cooler 112 and torrefaction reactor 108 comprise separate units or components of the system 100. In other embodiments, the cooler 112 and torrefaction reactor 108 may be integrated and be part of a single unit or component of the system. This, in turn, may allow for simplification, integration, and cost reduction. In such alternative embodiments, the torrefaction reactor may be modified so as to tolerate for additional gas flow due to the integration of the cooler.

With further reference to FIG. 1, partially cooled material leaves the cooler 112 (as represented by arrow 4). In an exemplary embodiment, material is gravity fed (fed solely or at least partially under the influence of gravity) from the cooler 112 through a variable speed rotary air lock. After exiting the cooler 112, material may then be sent directly to a pelletizer or other densifier (e.g., briquettes, etc.) and/or may be pneumatically, dense-phased conveyed to a product bin, etc.

In embodiments in which the cooled material is conveyed to a product bin, cooling air (e.g., ambient air, etc.) may be blown countercurrent through the product bin for further cooling of the torrefied product. The gas may exit the product bin through a dust collector system for particulate removal and for use as pneumatic conveying gas of the raw biomass.

FIG. 1 also illustrates the combustion air preheater 128 which receives air (as represented by arrow 19). The combustion air preheater 128 also receives gas (as represented by arrow 16) discharged by the jacket section 132 of the dryer/preheater 104. In this example, gases exiting the dryer/preheater 104 are used to heat the combustion air in the combustion air preheater 128, which, in turn, operates as an indirect heat exchanger as the gases from the dryer/preheater 104 are separated and not allowed to directly contact the combustion air. Gases exit the combustion air preheater 128 (as represented by arrow 21) and are introduced into the burner 120. The burner 120 also receives fuel (e.g., natural gas, etc.) as represented by arrow 20. Excess process gas or flue gas is exhausted from the combustion air preheater 128 and ultimately vented to atmosphere (as represented by arrow 17) after passing through heat exchanger 136. The remaining cooled gas may be sent (as represented by arrow 18) to the cooler 112.

A description will now be provided of an exemplary method of operating a system (e.g., system 100, etc.) to produce torrefied biomass. This exemplary method is described as being implemented using the system 100 shown in FIG. 1. Accordingly, the description of this method includes the reference numbers and arrows shown in FIG. 1. But aspects of this exemplary method may also be implemented while using other embodiments of the inventor's torrefaction systems.

Continuing with the description of this example torrefaction method, conventional technologies may first be used to reduce and control particle size of wet and/or dry biomass and to remove certain levels of contamination. This communition of the wet and/or dry biomass may include using various equipment (e.g., chipper, shredder, pelletizer, hammermill, etc.) and/or various processes (e.g., crushing, grinding, pelletizing, hammermill, etc.). Next, the conditioned biomass may be conveyed to a feed bin, such as by a dense-phase pneumatic convey system. Although this example torrefaction method includes densification of the end product via communication of torrefied biomass, this is not necessarily required for the biomass. While the densified end product (e.g., pellets, etc,) may be advantageously sized for long distance shipping, the added expense associated with communition or other densification process may be avoided, for example, if the torrefaction plant is located close to a power plant such that there is no need for long distance.

Convey gas may be obtained from off-gas from the cooler 112 to provide initial preheating of the biomass in some embodiments, though the off-gas from the cooler 112 may also or instead be directly recycled. Convey gas may be compressed to operating pressure, such as by a rotary-vane compressor. Convey gas may exit the feed bin through a dust collector to remove particulate emissions. Convey gas may also be obtained from either stream 17 or 18 dependant on process temperature and convey requirements.

The slightly preheated raw biomass is then gravity fed (arrow 1) to the preheater/dryer 104 through a variable speed rotary air lock. The variable speed rotary air lock controls biomass feed rate and provides an air lock from the feed bin to the preheater/dryer 104.

Hot gases from the catalyst bed 124 and heat exchanger 116 are fed both directly (arrows 13 and 14) to the dryer/preheater 104 and through the jacket 132 on the dryer/preheater 104. Steam evolved from the process is condensed in the jacket section 132 of the dryer/preheater 104. This is where the majority of the moisture from the biomass leaves the process. Condensate is drained (arrow 15) from the jacket 132 through a steam trap and discharged to the sewer for municipal waste water treatment.

Gas exiting the jacket 132 (arrow 16) may pass through a heat exchanger to be further cooled (arrow 22) and/or be introduced to the air preheater for preheating of the combustion air (arrow 19). Excess process gas is vented to atmosphere (arrow 17) after passing through heat exchanger 136, and additional condensate is drained. The remaining cooled gas (arrow 18) is used as countercurrent flow in the cooler 112, to provide initial cooling of torrefied biomass to cool the biomass below a safe temperature (e.g., ~150° C., etc.) to allow for further air cooling in the product bin.

Gases evolved from the preheater/dryer 104 (arrow 7) are combined with off gas from the cooler 112 (arrow 5) and gas from the torrefaction reactor 108 (arrow 6) after passing through dust collectors. These gases are then sent or pass through the heat exchanger 116 for catalyst preheating (arrow 8).

Then, the gases are introduced to the burner/preheater 120 for additional heating if needed (arrow 9). The hot gases are next introduced and passed through the catalyst bed (arrow 10), where oxygen is consumed and therefore removed through combustion in the catalyst bed. The oxygen reacts with fuels in combustion forming carbon dioxide and water (complete combustion). So as combustion progresses, the oxygen (including residual oxygen from the burner 120) is consumed and therefore removed through combustion. The catalyst bed achieves a low-temperature, low residual oxygen catalytic oxidation of the torrefaction gases produced.

Dried and preheated biomass exits the preheater/dryer 104 (arrow 4) through another variable speed rotary air lock, which controls feed rate to the torrefaction reactor 108 and provides an air lock between the reactor 108 and the preheater/dryer 104.

Hot combustion gas from the heat exchanger 116 (arrow 12) are fed (e.g., by using a blower at or towards the bottom of, etc.) to the torrefaction reactor 108. For example, the hot combustion gas from the heat exchanger 116 (arrow 12) may be fed to the torrefaction reactor 108 in a way that evenly or substantially evenly distributes the gas throughout the cross section of the biomass and/or allows generally uniform distribution of hot fluidizing gases throughout the reactor diameter. The hot gas flows upward (countercurrent) through the downwardly moving biomass in the torrefaction reactor 108. As noted above, a series of thermocouples is hung throughout the reactor 108 to allow monitoring of the bed temperature profile throughout the reactor 108. Reactor temperature is controlled by controlling the amount of hot gases being sent to the reactor 108.

The hot, torrefied biomass exits the bottom of the reactor (arrow 3) through another variable speed rotary air lock. The speed of this rotary air lock may be set to determine the overall production rate, which also determines reactor residence time. The rotary air lock also provides another air lock between the reactor 108 and cooler 112. Within the cooler 112, cooled gas flows upward and countercurrently to the biomass, which moves downward through the cooler 112. By way of example, a blower and motor may be used for blowing and causing the cooled gas to flow upward in the cooler 112. A series of thermocouples may be hung throughout the cooler 112 to allow monitoring of the temperature profile within or throughout the cooler 112. Cooler temperature may be controlled by controlling the amount of cooled gases being sent to the reactor 112.

The partially cooled material leaves the cooler 112 (arrow 4) through another rotary air lock, and can then be sent directly to a pelletizer or be pneumatically, dense-phased conveyed to the product bin. Cooling air (ambient) may be blown countercurrent through the product bin for further cooling. Gas exits the product bin through a dust collector for particulate removal and may be used for convey gas of the raw biomass to provide initial preheating before the biomass is introduced to the dryer/preheater 104. Additionally, or alternatively, convey gas may be obtained from off-gas (inert gas) from the cooler 112 to provide initial preheating of the biomass before it is introduced to the dryer/preheater. Also in this example, convey gas is obtained from either stream 17 or 18 dependant on process temperature and convey requirements. Gas exiting the product bin and/or off-gas from the cooler 112 may be compressed with a blower before conveyance and then used as convey gas depending on the application. The gas exiting the product bin is ambient air, while the off-gas from the cooler 112 is inert gas, such that it may also or instead be directly recycled. In embodiments in which the size, moisture content, type, and nature of the biomass is such that it has the potential for a dust explosion or could reach an explosive concentration while conveying, then the off-gas from the cooler 112 should be used as the convey gas since it is inert. Otherwise, the ambient air from the product bin may additionally or alternatively be preferably used as the convey gas. In addition, both the ambient air from the product bin and the off-gas from the cooler 112 may be warm streams that may do some preheating.

Examples of various operating parameters or conditions (e.g., pressure, temperature, compounds, gas flow rates, etc.) are shown in Tables 1 and 2 immediately below for the exemplary system 100 and method of producing torrefied biomass described above. The contents of Tables 1 and 2 are provided for purpose of illustration only as the tabulated numerical values, identified compounds, and other operating parameters or conditions may be changed or tailored depending, for example, on the particular type of torrefied product being produced.

With further regard to Tables 1 and 2 below, the numbers 1 through 21 refer to the particular location in the system 100 illustrated in FIG. 1 whereat the corresponding arrows 1 through 21 may be found. For example, a comparison of arrow 20 in FIG. 1 with column 20 in Table 2 below indicates that in this particular example the burner 120 receives 6.81 MM BTU/hr (million BTU per hour) natural gas at a pressure of 2.5 PSIG (pounds per square inch gauge) and temperature of 50 Deg F. (degrees Fahrenheit). The following additional abbreviations are also used in Tables 1 and 2: Lbs/hr (pounds per hour), SCFM (standard cubic feet per minute), ACFM (actual cubic feet per minute), LB/ft$^3$ (pounds per cubic feet), Min. (minutes), BTU/lb-F (BTU per pound Fahrenheit), and Ft/sec (feet per second).

TABLE 1

| Compound | Units | 1 | 2 | 3 | 4 | 5 | 6 | 7 | 8 | 9 | 10 | 11 |
|---|---|---|---|---|---|---|---|---|---|---|---|---|
| Nitrogen | Lbs/hr | | | | | 12,599 | 6,757 | 5,225 | 24,581 | 24,581 | 32,233 | 32,233 |
| Oxygen | Lbs/hr | | | | | 3.7 | 0.0 | 3.7 | 7.3 | 7.3 | 2,041 | 14.6 |
| Water | Lbs/hr | | | | | 1,801 | 12,974 | 20,816 | 35,591 | 35,591 | 35,665 | 40,020 |
| Carbon Dioxide | Lbs/hr | | | | | 9,609 | 5,153 | 5,418 | 20,180 | 20,180 | 20,180 | 25,257 |
| Glucose | Lbs/hr | | | | | 0 | 5,088 | 0 | 5,088 | 5,088 | 5,088 | 0 |
| Total | Lbs/hr | | | | | 25,378 | 27,713 | 31,463 | 85,447 | 85,447 | 95,208 | 97,524 |
| Gas Flow | SCFM | | | | | 4,862 | 7,006 | 9,276 | 21,144 | 21,144 | 23,301 | 24,982 |
| Gas Flow | ACFM | | | | | 8,915 | 9,486 | 9,661 | 29,214 | 40,547 | 53,022 | 57,512 |
| Biomass (wet) | Lbs/hr | 34,229 | 27,890 | 20,000 | 20,000 | | | | | | | |
| Biomass (bone-dry) | Lbs/hr | 25,355 | 25,355 | 19,802 | 19,802 | | | | | | | |
| Moisture | % | 35.0% | 10.0% | 1.0% | 1.0% | | | | | | | |
| Bulk density | Lb/ft3 | 22 | 11 | 12.1 | 12.1 | | | | | | | |
| Pressure | PSIG | 0.5 | 0.5 | 1.5 | 0 | 0.5 | 0.5 | 0.5 | 0.5 | 2.4 | 2.3 | 2.0 |
| Temperature | Deg F. | 50 | 248 | 536 | 248 | 526 | 268 | 100 | 283 | 700 | 908 | 900 |
| Residence Time | Min. | | | 37 | | | | | | | | |
| Heat capacity (BM) | BTU/lb-F. | 0.460 | 0.510 | 0.550 | 0.400 | | | | | | | |
| Heat capacity (gas) | BTU/lb-F. | | | | | 0.3 | 0.3656 | 0.3787 | 0.3347 | 0.3504 | 0.3502 | 0.3586 |
| Superficial gas vel. | Ft/sec | | | | | 3.15 | | | | | | |

TABLE 2

| Compound | Units | 12 | 13 | 14 | 15 | 16 | 17 | 18 | 19 | 20 | 21 |
|---|---|---|---|---|---|---|---|---|---|---|---|
| Nitrogen | Lbs/hr | 6,757 | 5,225 | 10,450 | 0 | 12,599 | 0 | 12,599 | 7,652 | 0 | 7,652 |
| Oxygen | Lbs/hr | 3.4 | 1.1 | 2.3 | 0.0 | 6.3 | 0.0 | 6.3 | 2,034 | 0 | 2,034 |
| Water | Lbs/hr | 10,712 | 10,837 | 16,408 | 11,720 | 4,688 | 2,887 | 1,801 | 74 | 0 | 74 |
| Carbon Dioxide | Lbs/hr | 5,153 | 5,418 | 10,837 | 0 | 9,609 | 0 | 9,609 | 0 | 0 | 0 |
| Total | Lbs/hr | 22,625 | 21,502 | 43,003 | 11,720 | 26,902 | 2,887 | 22,463 | 9,760 | 0 | 9,760 |
| Natural gas | MM BTU/hr | | | | | | | | | 6.81 | |
| Gas Flow | SCFM | 6,033 | 5,768 | 9,686 | 4,119 | 5,877 | 1,015 | 4,862 | 2,157 | 0 | 2,157 |
| Gas Flow | ACFM | 6,828 | 6,524 | 11,197 | 4,531 | 6,822 | 1,116 | 5,652 | 2,500 | 0 | 3,655 |
| Pressure | PSIG | 2.0 | 2.0 | 2.0 | 0 | 1.0 | 0 | 1.0 | 2.5 | 2.5 | 2.3 |
| Temperature | Deg F. | 750 | 750 | 750 | 150 | 150 | 120 | 120 | 50 | 50 | 125 |
| Heat capacity (gas) | BTU/lb-F. | 0.3681 | 0.3749 | 0.3150 | 0.4470 | 0.2831 | 0.4453 | 0.2814 | 0.2500 | | 0.2500 |

As disclosed herein, exemplary embodiments may include catalytic oxidation and gases that flow countercurrent relative to the flow of biomass through the torrefaction reactor, dryer/preheater, and/or cooler. In addition, or alternatively, some exemplary embodiments may include a combined torrefaction reactor and cooler, which are illustrated separately in FIG. 1. These three different disclosed features relating catalytic oxidation, countercurrent flow of gases through the biomass, and combined torrefaction reactor/cooler may be used individually or separately in some exemplary embodiments, or two or more of these features may be combined in other exemplary embodiments. Stated differently, the individual elements or features of a particular embodiment are generally not limited to that particular embodiment, but, where applicable, are interchangeable and can be used in a selected embodiment, even if not specifically shown or described. For example, some exemplary embodiments may include catalytic oxidation without any countercurrent gas flows or combined torrefaction reactor/cooler. As another example, other exemplary embodiments may include catalytic oxidation with co-current flow through one or more, but less than all, of the torrefaction reactor, dryer/preheater, and/or cooler.

The inventor hereof has realized that combining or integrating the torrefaction reactor and cooler into a single component may allow for reductions in equipment costs (e.g., by removing a separate piece of equipment, etc.) and manufacturing costs (e.g., heat may be used more efficiently, etc.). In some exemplary embodiments that include the combined torrefaction reactor/cooler, the biomass or product may fall downwardly in the combined torrefaction reactor/cooler by gravity as heat is blown in or introduced at or towards the beginning or bottom of the torrefaction section where the transition occurs between the torrefaction section and cooler in the combined unit. Cooled gas is introduced at or towards the bottom of the cooler section of the combined unit, which cooled gas would be heated as it flows countercurrently and upward through the torrefied biomass while cooling the torrefied biomass. In addition, some exemplary embodiments that include a combined torrefaction reactor/cooler may include catalytic oxidation while others do not include any catalytic oxidation. In addition, some exemplary embodiments that include a combined torrefaction reactor/cooler may include gases that flow countercurrent relative to the flow of biomass through the combined torrefaction reactor/cooler and/or dryer/preheater, while other exemplary embodiments may include no countercurrent gas flow through the combined torrefaction reactor/cooler and/or dryer/preheater.

The inventor's methods and systems disclosed herein may be used for producing a wide variety of torrefied products, such as energy pellets or other torrefied products. By way of further example, torrefied wood or agricultural pellets may be produced by the inventor's systems and methods that may be burned to produce energy in a cleaner, more environmentally friendly process as compared to the production of energy that includes coal burning. As another example, the torrefied biomass produced by the inventor's systems and methods may be used as a feedstock in a subsequent process for producing cellulosic ethanol.

In addition, the inventor's disclosed methods and systems may be used for producing torrefied products from a wide variety of cellulosic biomasses, such as wood, bark, agricultural, and crop materials. Example woods that may be used as the cellulosic biomass in the inventors' disclosed torrefaction methods and system include, but are not limited to beech, black locust, Douglas-fir, hickory, maple, ponderosa pine, poplar red alder, redwood, western hemlock, yellow pine, white fir, and white oak, etc. Example barks that may be used include Douglas-fir and loblolly pine bark. Example crops include eucalyptus camaldulensis, casuarina, poplar, switchgrass, and sudan grass, etc. Agricultural materials that may be used include peach pits, walnut shells, almond prunings, black walnut prunings, corncobs, wheat straw, cotton stalk, corn stover, corn stalks, rice stalks, sugarcane bagasse, rice hulls, pine needles, cattails, and/or plant residue after harvest, etc.

Accordingly, the inventor's disclosed torrefaction systems and methods may provide one or more of the following advantages such as a relatively simple, low-cost reactor design and ease of scale-up and/or low air emissions for nitrogen oxides ($NO_x$) (e.g., nitric oxide and nitrogen dioxide), carbon monoxide (CO) and volatile organic compounds (VOCs). Additional or alternative advantages may include improved energy efficiency through heat integration and direct use of combustion gases in the torrefaction reactor and/or cooler, and/or precise control of key product variables (reactor residence time and temperature) for consistency and uniformity of product. Further or alternative advantages may include process gas and air cooling eliminating need for cooling water and/or eliminating the need to have to purchase inert gas for cooling. Another possible advantage is a flexible design that allows production of pelletized torrefied biomass, non-pelletized torrefied biomass, or pelletized non-torrefied biomass (e.g., wood or agricultural pellets, etc.), and/or minimal or reduced utilities infrastructure costs. It should be noted that the advantages disclosed herein are exemplary only and not limiting, as exemplary embodiments of the present disclosure may achieve all, some, or none of the above-listed advantages.

With the improved heat integration and direct reuse of the combustion gases, some exemplary embodiments are more easily and cost effectively made to be energy self-sufficient after the initial startup of the system. As recognized by the inventor hereof, the energy balance of a torrefaction process depends on many variables including the following: the type of biomass (including not only species, but also geographic region and growing season), moisture content, degree of torrefaction, and energy efficiency of process. A torrefaction process typically can be made energy self sufficient by increasing the degree of torrefaction until that goal is reached, but this is achieved at the expense of reducing the energy yield of the process. The additional energy that is consumed during the process is energy that is not available in the final product. The inventor's torrefaction technology allows for increased energy yield by consuming less energy from the biomass or for a product with a lower desired degree of torrefaction that is not energy self sufficient, such that less external energy is required to be input, thereby decreasing the operating cost. Accordingly, an exemplary embodiment of the inventor's torrefaction system and method may be configured or made to be energy self sufficient, though this is optional and not required for all exemplary embodiments.

Example embodiments are provided so that this disclosure will be thorough, and will fully convey the scope to those who are skilled in the art. Numerous specific details are set forth such as examples of specific components, systems, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the disclosure of particular values (e.g., dimensions, pressures, temperatures, times, etc.) herein is not exclusive of other values that may be useful in other example embodiments.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. The disclosure of a first value and a second value for a given parameter can be interpreted as disclosing that any value between the first and second values could also be employed for the given parameter. Similarly, it is envisioned that disclosure of two or more ranges of values for a parameter (whether such ranges are nested, overlapping or distinct) subsume all possible combination of ranges for the value that might be claimed using endpoints of the disclosed ranges.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for torrefying biomass, the method comprising:
   using an oxidation catalyst to combust gas produced by torrefaction, and thereby produce combustion flue gas; and
   introducing the combustion flue gas into a torrefaction reactor for supplying heat to the torrefaction reactor to support direct heating and/or torrefying of the biomass in the torrefaction reactor.

2. The method of claim 1, wherein the method includes:
   combusting off-gas from the torrefaction reactor in a fixed-bed catalyst for low-temperature oxidation of the off-gas to produce a low residual-oxygen combustion flue gas; and
   using the low residual-oxygen combustion flue gas for supplying heat to the torrefaction reactor, for pre-drying the biomass, and/or for heat exchange purposes for treating, cooling, and/or torrefying the biomass.

3. The method of claim 1, wherein the method includes introducing the combustion flue gas into the torrefaction reactor such that the combustion flue gas contacts the biomass in the torrefaction reactor.

4. The method of claim 1, wherein the method includes:
   introducing the combustion flue gas into the torrefaction reactor such that the combustion flue gas contacts the biomass in the torrefaction reactor, and thereby supports direct heating and/or torrefying of the biomass in the torrefaction reactor; and/or
   introducing the combustion flue gas into a cooler such that the combustion flue gas contacts torrefied biomass in the cooler, and thereby supports direct cooling of the torrefied biomass in the cooler; and/or
   introducing the combustion flue gas into a dryer/preheater such that the combustion flue gas contacts biomass in the dryer/preheater, and thereby supports direct preheating, extraction of moisture, and/or drying of the biomass in a dryer/preheater; and/or
   using the combustion flue gas in a condensation jacket of a dryer/preheater to support indirect heating of biomass in the dryer/preheater.

5. The method of claim 1, wherein the method includes:
   using an oxidation catalyst that provides a low residual-oxygen flue gas stream usable directly in the torrefaction reactor; and/or
   using a fixed-bed catalyst for low-temperature oxidation of torrefaction byproducts.

6. The method of claim 1, wherein the combustion flue gas flows countercurrent to the biomass in the torrefaction reactor.

7. The method of claim 1, wherein the method includes introducing into the torrefaction reactor a combination of superheated steam from process moisture, superheated steam and carbon dioxide which are byproducts of catalytic oxidation combustion, and residual nitrogen from combustion air.

8. A method for torrefying biomass, the method comprising:
   using an oxidation catalyst to combust gas produced by torrefaction, and thereby produce combustion flue gas; and
   introducing the combustion flue gas into a cooler to support direct cooling of torrefied biomass in the cooler.

9. The method of claim 8, wherein the method includes introducing the combustion flue gas into the cooler such that the combustion flue gas contacts the torrefied biomass in the cooler.

10. The method of claim 8, wherein the method includes:
    introducing the combustion flue gas into the cooler such that the combustion flue gas contacts the torrefied biomass in the cooler, and thereby supports direct cooling of the torrefied biomass in the cooler; and/or
    introducing the combustion flue gas into a torrefaction reactor, such that the combustion flue gas contacts biomass in the torrefaction reactor, and thereby supports direct heating and/or torrefying of the biomass in the torrefaction reactor; and/or
    introducing the combustion flue gas into a dryer/preheater such that the combustion flue gas contacts biomass in the dryer/preheater, and thereby supports direct preheating, extraction of moisture, and/or drying of the biomass in a dryer/preheater; and/or
    using the combustion flue gas in a condensation jacket of a dryer/preheater to support indirect heating of biomass in the dryer/preheater.

11. The method of claim 8, wherein the method includes using an oxidation catalyst that produces an inert gas stream that allows integration of the cooler with a torrefaction reactor; and wherein the cooler and the torrefaction reactor are integrated into a single unit that includes both the cooler and the torrefaction reactor.

12. The method of claim 8, wherein the method includes:
using an oxidation catalyst that provides low residual-oxygen flue gas stream usable in the cooler for safely cooling hot torrefaction products in the cooler; and/or
using a fixed-bed catalyst for low-temperature oxidation of torrefaction byproducts.

13. The method of claim 8, wherein the method includes recovery of heat from the cooler which can subsequently be reused in the method for torrefyinq biomass.

14. The method of claim 8, wherein the combustion flue gas flows countercurrent to the biomass in the cooler.

15. A system for biomass torrefaction comprising a catalyst system including an oxidation catalyst to combust gas produced by torrefaction, whereby resultant combustion flue gases produced by the oxidation catalyst are directly reusable by the system to support torrefaction of biomass in a torrefaction reactor by contact with the biomass in the torrefaction reactor and/or to support cooling of torrefied biomass in a cooler by contact with the torrefied biomass in the cooler.

16. The system of claim 15, wherein:
the catalyst system comprises a fixed-bed catalyst system operable for low-temperature, low residual oxygen catalytic oxidation of off-gas from the torrefaction reactor; and/or
the oxidation catalyst of the catalyst system comprises a platinum/palladium catalyst.

17. The system of claim 15, further comprising:
a torrefaction reactor configured to receive the resultant combustion flue gases to thereby support direct heating and/or torrefying of the biomass in the torrefaction reactor;
a dryer/preheater configured to receive the resultant combustion flue gases to thereby support direct preheating, extraction of moisture, and/or drying of the biomass; and
a cooler configured to receive the resultant combustion flue gases to thereby support direct cooling of torrefied biomass in the cooler.

18. The system of claim 17, wherein:
the system is configured such that resultant combustion flue gases flow countercurrent to biomass in the torrefaction reactor, the dryer/preheater, and the cooler; and/or
the dryer/preheater includes a condensation jacket configured to receive the resultant combustion flue gases to support indirect heating of biomass in the dryer/preheater; and/or
the torrefaction reactor comprises a fluidized-bed torrefaction reactor configured such that the resultant combustion flue gases flow countercurrent to the biomass; and/or
the system further comprises an integrated unit including the torrefaction reactor and the cooler; and/or
the system is operable for selectively producing torrefied biomass or non-torrefied biomass.

19. The method of claim 1:
wherein the method further comprises introducing the combustion flue gas into a heat exchanger before introducing the combustion flue gas into the torrefaction reactor, such that the combustion flue gas is introduced into the torrefaction reactor from the heat exchanger; and/or
wherein the gas produced by torrefaction comprises byproducts present in off-gas from at least one or more of a cooler, a preheater/dryer, and/or the torrefaction reactor, and the method includes using the oxidation catalyst to combust the byproducts; and/or
wherein the method includes obtaining a low residual oxygen level in the combustion flue gas by combusting torrefaction byproducts in a fixed-bed catalyst at low oxygen levels by control of the combustion airflow.

20. The method of claim 8:
wherein the method includes cooling the combustion flue gas before introducing the combustion flue gas into the cooler, which thereby provides an inert gas stream that is introduced into the cooler and contacts biomass in the cooler; and/or
wherein the use of an oxidation catalyst provides combustion flue gas that remains inert when cooled to a lower temperature associated with a cooling process, thereby providing an inert cooling gas that is directly reusable in the cooler; and/or
wherein the gas produced by torrefaction comprises byproducts present in off-gas from at least one or more of the cooler, a preheater/dryer, and/or a torrefaction reactor, and the method includes using the oxidation catalyst to combust the byproducts; and/or
wherein the method further comprises introducing the combustion flue gas into a heat exchanger before introducing the combustion flue gas into the cooler.

* * * * *

UNITED STATES PATENT AND TRADEMARK OFFICE
CERTIFICATE OF CORRECTION

PATENT NO.        : 8,203,024 B2
APPLICATION NO.   : 13/238890
DATED             : June 19, 2012
INVENTOR(S)       : Mark Alan Leonhardt It is certified that error appears in the above-identified patent and that said Letters Patent is hereby corrected as shown below:

Title Page, Item (73) ASSIGNEE

Replace "Advanced Toffefaction Systems, LLC" with "Advanced Torrefaction Systems, LLC"

Signed and Sealed this
Eighteenth Day of December, 2012

David J. Kappos
*Director of the United States Patent and Trademark Office*